United States Patent [19]

DiFranco

[11] Patent Number: 4,903,375
[45] Date of Patent: Feb. 27, 1990

[54] POCKET CLIP FOR EYEGLASSES

[76] Inventor: Jack E. DiFranco, 1077 River Rd., Edgewater, N.J. 07020

[21] Appl. No.: 376,647

[22] Filed: Jul. 7, 1989

[51] Int. Cl.⁴ .............................................. A44B 21/00
[52] U.S. Cl. ..................................... 24/3 C; 24/3 R; 24/3 J
[58] Field of Search .............. 24/3 C, 3 R, 3 J, 3 H, 24/3 G, 3 L, 129 D, 300, 499, 500, 501

[56] References Cited

U.S. PATENT DOCUMENTS

| | | | |
|---|---|---|---|
| 104,720 | 6/1870 | Farrington | 24/501 |
| 1,779,015 | 10/1930 | Schmitt | 24/3 J |
| 1,787,830 | 1/1931 | Marvin | 24/3 J |
| 1,898,059 | 2/1933 | McDonald | 24/3 J |
| 1,973,648 | 9/1934 | Nagel | 24/3 J |
| 3,827,790 | 8/1974 | Wenzel | 24/3 C |

FOREIGN PATENT DOCUMENTS

| | | | |
|---|---|---|---|
| 788663 | 7/1968 | Canada | 24/3 J |
| 1271944 | 8/1961 | France | 24/500 |

Primary Examiner—Victor N. Sakran
Attorney, Agent, or Firm—Alvin S. Blum

[57] ABSTRACT

A spring clip attaches to the temple bar of eyeglasses to engage the edge of a fabric pocket for temporary but secure storage. The clip is formed of a single piece of springy plastic in the form of inner and outer elongate legs joined at one end. The inner leg has at least two transverse grooves to receive elastic O-rings. The O-rings slip over a temple bar and the inner leg. The O-rings hold the inner leg of the clip tightly against the temple bar and the outer leg holds the outer surface of the fabric pocket against the inner leg with spring bias. By providing O-rings of several different diameters, the clip is readily attached to a variety of sizes and shapes of temple bars or earpieces without tools or special skills.

10 Claims, 1 Drawing Sheet

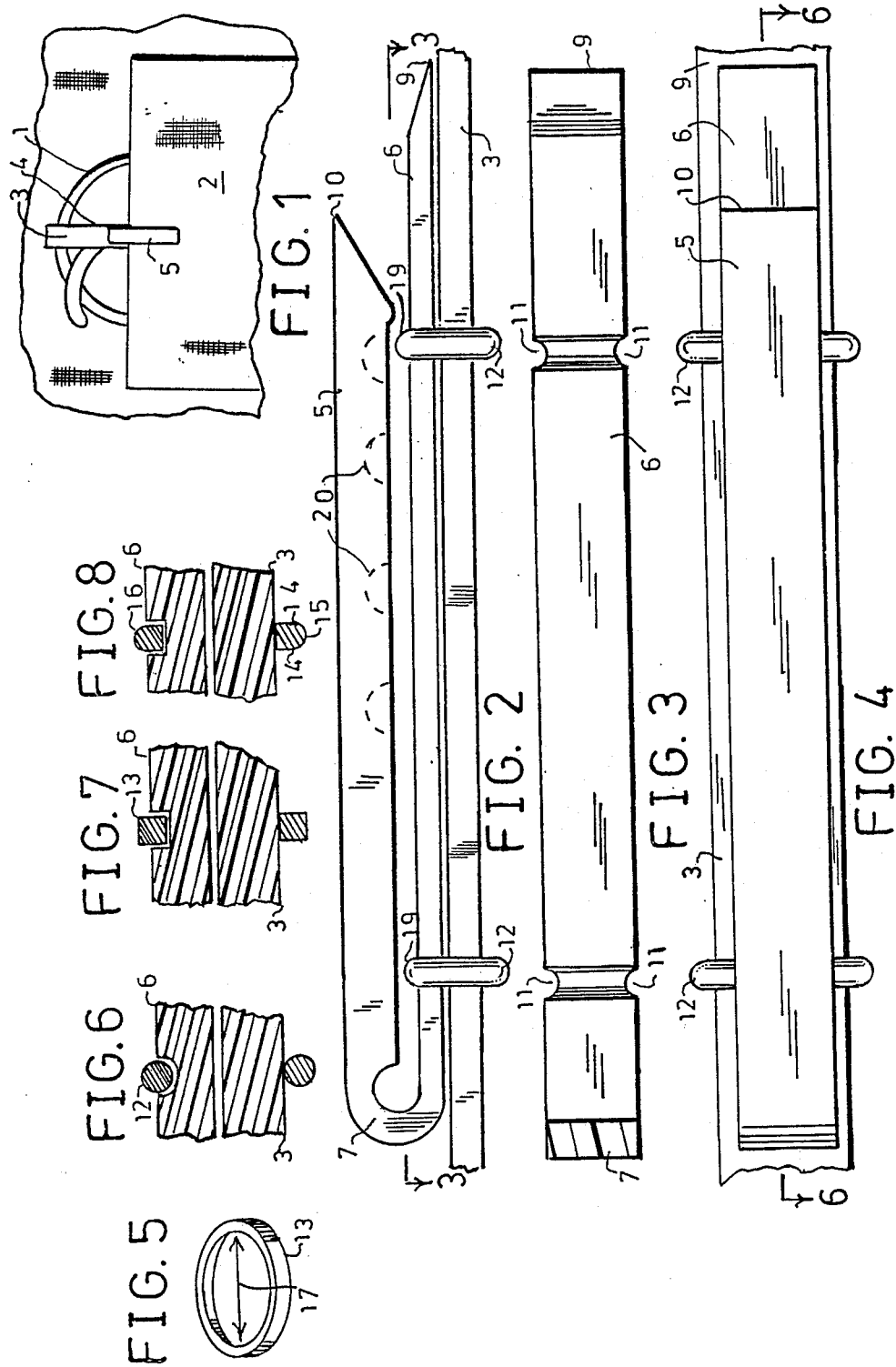

POCKET CLIP FOR EYEGLASSES

This invention relates to holding or securing devices and more particularly to a pocket clip that slides onto the temple bar or earpiece of a pair of spectacles that makes it possible to retain the folded glasses in a shirt pocket when bending over.

BACKGROUND OF THE INVENTION

Many individuals wear eyeglasses only for special purposes, such as reading, or bright sunlight. At other times the eyeglasses are stored at an accessible location on the person where they will not be damaged or soiled. A shirt or jacket pocket is the favored location. One problem is that bending over may cause the glasses to slide out and be lost or damaged.

Spring clips secured to the temple bar or earpiece of spectacles are disclosed in U.S. Pat. No. 1,779,015 issued 10/21/30 to Schmitt; U.S. Pat. No. 1,787,830 issued 1/6/31 to Marvin and U.S. Pat. No. 1,973,648 issued 9/11/34 to Nagel.

Schmitt and Marvin teach a leaf spring secured at its head to the temple bar by clamp or rivet.

Nagel teaches a leaf spring struck out of a metal plate with the head of the leaf spring attached to the plate. The plate is then curved around a resilient tube. The tube slips onto the temple bar. A catch on the plate engages the alternate earpiece to hold the glasses closed. The clips of the prior art are not readily adapted for attachment to the great variety of the sizes and shapes of earpieces in use, nor are they inexpensive to manufacture, nor are they easily attached by the user.

SUMMARY OF THE INVENTION

It is accordingly an object of the invention to provide a securing clip that is economical to manufacture and that is readily applied by the unskilled user to eyeglasses of greatly varying size and shapes.

The clip of the invention comprises a pair of substantially parallel elongate members joined at a first end, free at a second end, and having a springy resilience to provide a spring bias tending to maintain the parallel relationship of the two members when an edge of clothing such as a pocket is inserted into said second end. It is economically molded in a single plastic part.

One of the two members is adapted for securing to the temple bar by means of one or more resilient rings that seat in one or more grooves in the member. A plurality of different diameter rings may be economically provided with the device for greater versatility in fitting earpieces of different sizes. The rings are made out of elastic material to stretch over the earpiece and tightly clamp the first member in place without the use of special tools or skills. The rings project into the space between the two members to enhance the clothing engaging function.

These and other objects, features and advantages of the invention will become more apparent when the detailed description is considered in conjunction with the accompanying drawings.

BRIEF DESCRIPTION OF THE DRAWINGS

FIG. 1 is a front elevation view of the invention in use in a shirt pocket.

FIG. 2 is a side elevation view of the invention on a temple bar.

FIG. 3 is a sectional view through 3—3 of FIG. 2.

FIG. 4 is a top view of the device of FIG. 1.

FIG. 5 is a perspective view of an O-ring of the invention.

FIG. 6 is a partial sectional view through line 6—6 of FIG. 4.

FIG. 7 is a view as in FIG. 6 with an alternative O-ring.

FIG. 8 is a view as in FIG. 6 with an alternative O-ring.

DETAILED DESCRIPTION OF PREFERRED EMBODIMENTS

Referring now first to FIG. 1, a pair of eyeglasses 1 is stored in a shirt pocket 2. Attached to the temple bar 3 of glasses 1 is a plastic clip 4 of the invention. The outer leg 5 of the clip 4 fits over the outside of the pocket and presses the fabric of the pocket against the inner leg (not visible) of the clip with spring bias. This prevents the glasses from sliding out of the pocket inadvertently.

Referring now to FIGS. 2–4 showing the clip in side, sectional and top views, the clip includes an outer leg 5 and an inner leg 6 joined by springy end 7. This is molded in one piece of a springy plastic. Inner leg 6 terminates in a downward sloping narrow edge 9. Outer leg 5 terminates in an upward sloping narrow edge 10.

Grooves 11 in the top and side surfaces of inner leg 6 are adapted to receive elastic O-rings 12. the depth of the grooves is such that a portion of the O-ring extends into the space between inner and outer legs.

FIG. 5 shows a sample O-ring 13 and FIG. 6 shows how the O-ring will look when seated in the grooves. FIG. 6 shows an O-ring with round cross section, FIG. 7 shows an O-ring 13 with a rectangular cross section, and FIG. 8 shows an O-ring 16 having a cross section shape with three straight sides 14 and one curved side 15.

The O-rings provided have an internal diameter 17 great enough to slide onto the earpiece or temple bar and small enough to hold inner leg 6 of clip 4 tightly against the temple bar 3 when the O-ring is seated in groove 11. O-rings of several diameters may be economically provided so that the clip may be used with earpieces of different sizes, with the O-rings having sufficiently elasticity to compensate for earpieces of intermediate size.

By providing for at least two O-rings, the clip can be held tightly against lateral movement on the earpiece. Because the O-rings are not fixed to the clip, they can be easily inserted over very curved and enlarged ends of earpieces one at a time. After they are in place, the inner leg 6 of the clip may be inserted into them. The tapered end 9 facilitates this operation. It also prevents catching that end on the pocket when in use. Stretching the O-ring over the inner leg 6 pulls the O-ring tight against the temple bar 3. The free end 10 of the outer leg 5 is tapered to cause the clip to open when it encounters the edge of the pocket.

The projection 19 of the O-rings 12 into the space between the two legs 5 and 6 may enhance engagement of the pocket, since the clip 4 is of a slick plastic and the O-ring is of a rubbery material that will frictionally engage the fabric.

Serrations 20, shown in phantom may be molded into leg 5 to further enhance gripping of the pocket.

When molding a clip of this type, it is easier to mold if there is space between inner and outer legs, whereas gripping is better if there is little or no space. The projections 19 of the O-rings into the space between the legs helps to narrow this space for better spring action when the legs are forced apart by the pocket.

The above disclosed invention has a number of particular features which should preferably by employed in a combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A clip for yieldably attaching eyeglasses, having temple bars, to a support such as the fabric edge of a pocket comprising:
    (a) an elongate inner leg having short first and second ends;
    (b) an elongate outer leg having short first and second ends;
    (c) a joining member springably joining said first and of said inner leg to said frist and of said outer leg and maintaining a space between said inner and outer legs with spring bias for gripping said fabric edge therebetween; and
    (d) at least two elastic O-rings, having an inner diameter sufficient to tightly encircle said inner leg and one of said temple bars;
    (e) at least two groove means for engaging said O-rings, said groove means in the surface of said inner leg adjacent said outer leg and arranged transversely to the long axis of said inner leg, wherein said O-rings tightly encircle said temple bar and said inner leg to securely attach said clip to said temple bar and said groove means securely engage said O-rings to prevent movement therebetween.

2. The clip according to claim 1 in which said groove means and said O-rings are arranged to provide for a projection of a portion of said O-rings into said space between said legs when said O-rings are seated in said grooves for enhanced gripping of said fabric edge.

3. The clip according to claim 1 in which said O-rings have a generally circular cross section.

4. The clip according to claim 1 in which said O-rings have a generally rectangular cross section.

5. The clip according to claim 1 in which said O-rings have a cross section with three straight sides and one curved side.

6. The clip according to claim 1 in which said inner and outer legs and said joining member are formed in one piece from a springy material.

7. The clip of claim 6 in which said spring material is a plastic.

8. The clip according to claim 1 in which said O-rings are formed from an elastomeric plastic.

9. The clip according to claim 1 in which said groove means further extend along the sides of said inner leg to further enhance engagement of said O-rings by said inner leg.

10. The clip according to claim 1 in which said second end of said inner leg is tapered to extend a greater distance along the surface in contact with said temple bar for enhanced operation.

* * * * *